US008925035B2

(12) United States Patent
Dutta et al.

(10) Patent No.: US 8,925,035 B2
(45) Date of Patent: *Dec. 30, 2014

(54) SYSTEM AND METHOD FOR DOCUMENT ISOLATION

(75) Inventors: Tanmoy Dutta, Redmond, WA (US); Alexander G. Balikov, Redmond, WA (US); Himani Naresh, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 555 days.

This patent is subject to a terminal disclaimer.

(21) Appl. No.: 12/731,774

(22) Filed: Mar. 25, 2010

(65) Prior Publication Data

US 2010/0242085 A1   Sep. 23, 2010

Related U.S. Application Data

(63) Continuation of application No. 11/354,445, filed on Feb. 15, 2006, now Pat. No. 7,698,379, which is a continuation of application No. 09/607,170, filed on Jun. 29, 2000, now Pat. No. 7,035,910.

(51) Int. Cl.
*H04L 9/32* (2006.01)
*G06Q 10/10* (2012.01)

(52) U.S. Cl.
CPC ......... *G06Q 10/10* (2013.01); *Y10S 707/99938* (2013.01)
USPC .............. 726/1; 726/27; 713/165; 707/608; 707/999.008

(58) Field of Classification Search
USPC ................... 707/608; 713/165; 726/27, 1, 26; 706/14; 705/300, 301
See application file for complete search history.

(56) References Cited

U.S. PATENT DOCUMENTS

| | | | |
|---|---|---|---|
| 5,555,375 A | 9/1996 | Sudama et al. | |
| 5,649,185 A | 7/1997 | Antognini et al. | |
| 5,787,175 A | 7/1998 | Carter | |
| 5,812,776 A | 9/1998 | Gifford | |
| 5,835,758 A | 11/1998 | Nochur et al. | |
| 6,003,011 A * | 12/1999 | Sarin et al. | 705/7.26 |
| 6,052,514 A | 4/2000 | Gill et al. | |
| 6,052,684 A | 4/2000 | Du | |

(Continued)

OTHER PUBLICATIONS

Gregor Joeris et al, Flow.net: workflow support for inter-organizational engineering and production processes, pp. 1-15, International Journal of agile manufacturing, 2000.*

(Continued)

*Primary Examiner* — David García Cervetti
*Assistant Examiner* — Shanto M Abedin
(74) *Attorney, Agent, or Firm* — Tom Wong; Micky Minhas

(57) ABSTRACT

A computer based system and method of providing document isolation during routing of a document through a workflow is disclosed. The method comprises maintaining a separate "working" copy of the original base document while the document is routed through a workflow. Access controls, which define who may access the original document as well as any versions of the working copy document, are defined and stored in relation to the documents. The access controls further define the types of actions users may take with respect to the document. Users are selectively directed to the appropriate document, either the base document or working copy, and selectively granted permission to perform publishing operations on the working copy document, as determined by the access controls.

20 Claims, 10 Drawing Sheets

(56) References Cited

U.S. PATENT DOCUMENTS

| | | | |
|---|---|---|---|
| 6,064,977 A * | 5/2000 | Haverstock et al. | 705/7.18 |
| 6,067,551 A * | 5/2000 | Brown et al. | 1/1 |
| 6,088,679 A * | 7/2000 | Barkley | 705/7.26 |
| 6,240,414 B1 * | 5/2001 | Beizer et al. | 1/1 |
| 6,311,192 B1 | 10/2001 | Rosenthal et al. | |
| 6,314,425 B1 * | 11/2001 | Serbinis et al. | 1/1 |
| 6,357,010 B1 | 3/2002 | Viets et al. | |
| 6,393,437 B1 * | 5/2002 | Zinda et al. | 717/124 |
| 6,434,607 B1 * | 8/2002 | Haverstock et al. | 709/217 |
| 6,442,563 B1 | 8/2002 | Bacon et al. | |
| 6,470,353 B1 | 10/2002 | Yaung et al. | |
| 6,539,404 B1 * | 3/2003 | Ouchi | 715/205 |
| 6,584,466 B1 | 6/2003 | Serbinis et al. | |
| 6,757,893 B1 * | 6/2004 | Haikin | 717/170 |
| 6,973,458 B1 | 12/2005 | Maeda et al. | |
| 7,082,475 B2 * | 7/2006 | Haverstock et al. | 709/246 |
| 7,219,304 B1 * | 5/2007 | Kraenzel et al. | 715/755 |
| 2002/0038357 A1 * | 3/2002 | Haverstock et al. | 709/218 |

OTHER PUBLICATIONS

Clarence Ellis et al, Dynamic Change Within Workflow Systems, ACM, 1995.*

Elisa Bertino et al, The specification and enforcement of authorization constraints in workflow management systems, pp. 65-104, ACM, 1999.*

Clarence Ellis et al, Dynamic change within workflow systems, pp. 10-21, ACM, 1995.*

* cited by examiner

SYSTEM AND METHOD FOR DOCUMENT ISOLATION

CROSS REFERENCE TO RELATED APPLICATION

This application is a continuation of U.S. patent application Ser. No. 11/354,445 filed Feb. 15, 2006 and entitled "SYSTEM AND METHOD FOR DOCUMENT ISOLATION," which application is a continuation of U.S. patent application Ser. No. 09/607,170 filed Jun. 29, 2000 entitled "SYSTEM AND METHOD FOR DOCUMENT ISOLATION," the contents of all of which are hereby incorporated herein by reference in their entirety.

TECHNICAL FIELD

The present invention relates generally to the field of workflow management systems and, more particularly, to methods and systems for restricting access to documents and operations performed on those documents while being routed through a workflow.

BACKGROUND

Computer based document management systems, which traditionally have provided a mechanism to organize and control access to electronic documents, have been improved to facilitate workflow and document publishing. For example, document management systems now provide the capability to define a workflow template that specifies that a person or set of persons must review or approve a document before the document is made generally available. Such workflow templates are particularly useful in a document publishing environment where approval processes are commonplace.

A particularly important operation in workflow systems is managing access to documents as they move through various stages of a workflow. In a typical document-publishing scenario, significant time can elapse between creation of a document and final approval of the document for external viewing or publishing. For example, after an author revises an existing document and enters the revised document into a publishing workflow, several editors may need to review the document prior to the document receiving final approval for viewing by people outside the publishing group. It may take an extended period before the editors have an opportunity to review the document. In the meantime, it is necessary to restrict access to the revised document until it receives final approval. Indeed, it is necessary to restrict access to the document even if the editing process takes only short time. Editors should be given access to the new version of the document for purposes of editing and approving the document while those without approval authority should be given access to the original version of the document without revisions. Thus, it can be said that the original or "base" document and the revised document should be maintained separately, or "isolated" from each other and access given as appropriate to one or the other during the period that the document is undergoing approval in the publishing workflow.

It is also necessary to control access to the publishing operations that may be performed on a document as it is routed through a workflow. For example, while a document may be checked-out for revision numerous times during the course of a workflow, at any given time, however, only specific sets of individuals should have permission to perform this operation.

Thus, there is a need for systems and methods for controlling access to documents and operations to be performed on those documents while documents are routed through a workflow. Specifically, there is a need for systems and methods to "isolate" the base document from the revised document that is undergoing editing in a workflow. Users should selectively be directed to the appropriate version of the document that they are authorized to see. Further, users should selectively be permitted to perform operations on the documents. Preferably, the systems and methods are extensible to accommodate user-defined workflows and workflow operations.

SUMMARY

The present invention is directed toward systems and methods to address these needs. According to an aspect of the invention, when a revision is made to an original or "base" document and the revision placed in a workflow, a separate "working" copy of the base document is generated. As the document moves through the workflow, new versions of the "working" copy document may also be generated. Security controls, which define who may access the base document as well as any versions of the working copy document, are defined and stored in relation to the documents. The security controls further define the types of actions users may take with respect to the document. For example, the security controls may specify that a user should be given access to the working copy document as opposed to the base document and should have the capability to check-out the working copy of the document for revision.

Upon receipt of a request to perform an operation on a document during the period that the document is in the workflow, the security controls are referenced to determine whether the user has permissions to perform the operation as well as to which version of the document the user should be directed. For example, a user may desire to check-out a document for purposes of editing the document. The security controls associated with the document are referenced to identify to which version of the document the user should be directed as well as to determine whether the particular user may check-out the document for editing.

In an embodiment of the invention, users are assigned roles and document security controls are defined in terms of these roles. For example, in a publishing workflow having an editing state and approval state, users might be assigned one of two different roles, reviewer and approver. During the editing state, the security controls might be defined to provide check out capabilities to reviewers while denying check-out privileges to approvers. When the document enters the approval state, the security controls are defined to grant approvers check-out privileges while denying the same privileges to reviewers.

As will be readily appreciated from the foregoing description, systems and methods in accordance with the invention facilitate controlling access to documents and the operations performed on those documents during periods when the document is undergoing revision in a workflow.

BRIEF DESCRIPTION OF THE DRAWINGS

Other features of the invention are further apparent from the following detailed description of presently preferred exemplary embodiments of the invention taken in conjunction with the accompanying drawings, of which.

DETAILED DESCRIPTION OF ILLUSTRATIVE EMBODIMENTS

Overview

The present invention is directed to novel systems and methods for controlling access to information, particularly documents. According to an aspect of the invention, when a revision is made to a document and the revision placed in a publishing workflow, a separate "working" copy of the original or "base" document is generated. As the document moves through the workflow, new versions of the "working" copy document may also be generated. Security controls, which are used to identify who may access the base document as well as to determine which version of the working copy document a user should be directed to if one exists, are defined and stored in relation to the documents. The security controls further define the types of actions users may take with respect to the document. For example, the security controls may be used in combination with information regarding the state of the document and the role of the user to identify that a user should be given access to the working copy document and should have the capability to check-out the working copy of the document for revision.

Prior to explaining the details of the invention, it is useful to provide a description of a suitable exemplary environment in which the invention may be implemented.

Exemplary Operating Environment

1. A Computer Environment

Figure 1:
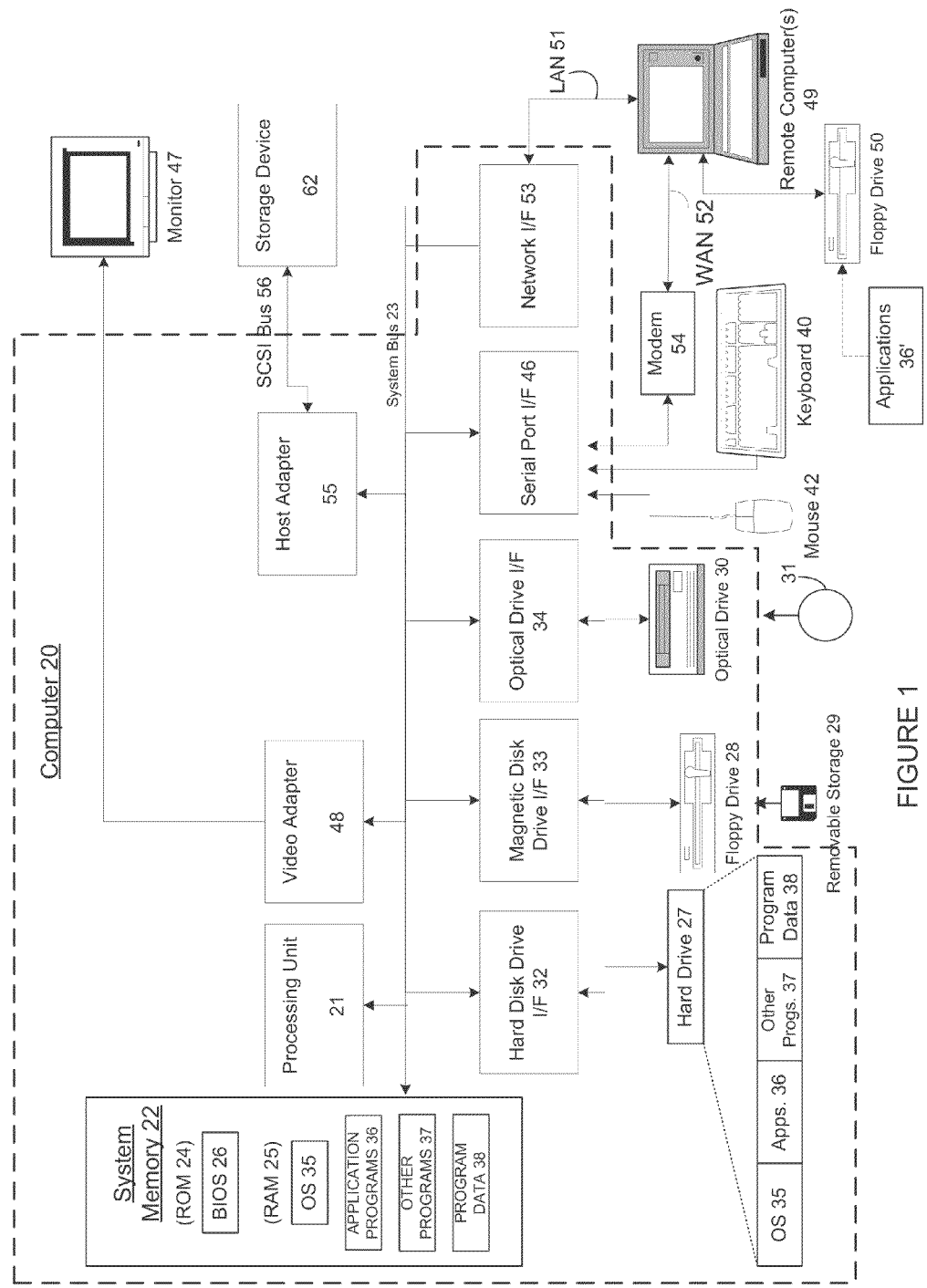
FIG. 1 is a block diagram of a general purpose computer system for implementing the present invention.

FIG. 1 and the following discussion are intended to provide a brief general description of a suitable computing environment in which the invention may be implemented. Although not required, the invention will be described in the general context of computer-executable instructions, such as program modules, being executed by a computer, such as a workstation or server. Generally, program modules include routines, programs, objects, components, data structures and the like that perform particular tasks or implement particular abstract data types. Moreover, those skilled in the art will appreciate that the is invention may be practiced with other computer system configurations, including hand-held devices, multi-processor systems, microprocessor-based or programmable consumer electronics, network PCS, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard 20 disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive, 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Further, as used herein, the term "computer readable medium" includes one or more instances of a media type (e.g., one or more floppy disks, one or more CD-ROMs, etc.).

A number of program modules may be stored on the hard disk, magnetic disk 29, optical disk 31, ROM 24 or RAM 25, including an operating system 35, one or more application programs 35, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2:
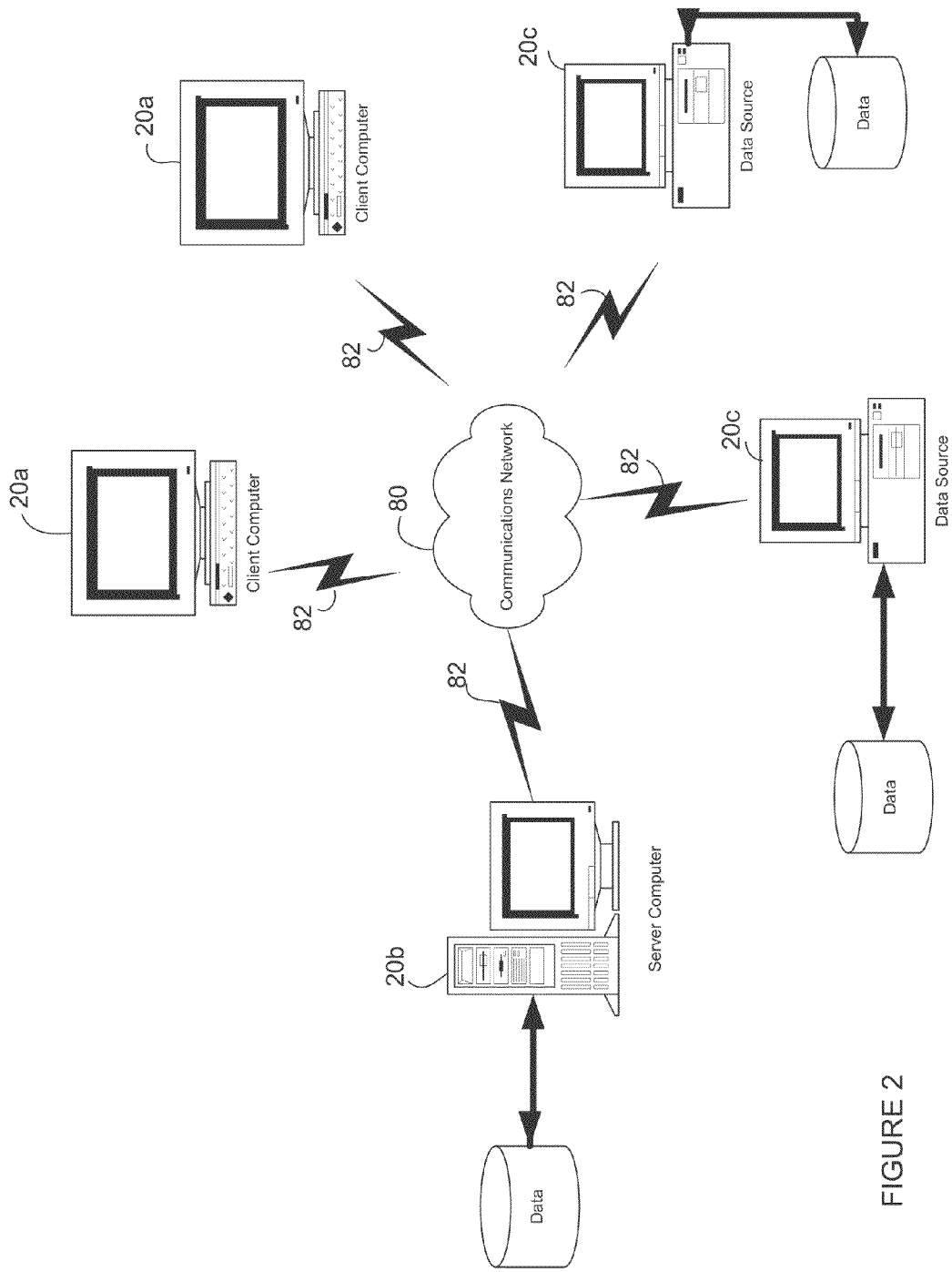
FIG. 2 is a block diagram illustrating a network architecture, in accordance with the present 15 invention.

FIG. 2 illustrates an exemplary network environment in which the present invention may be employed. Of course, actual network environments can be arranged in a variety of configurations; however, the exemplary environment shown here provides a framework for understanding the type of environment in which the present invention operates.

The network may include client computers 20a, server computer 20b, and data source computers 20c. Client computers 20a and data source computers 20c are in electronic communication with the server computer 20b via communications network 80 which may be, for example, the Internet. Client computers 20a and data source computers 20c are connected to the communications network by way of communications interfaces 82. Client computers 20a, data source computers 20c, and server computers 20a are computing systems such as, for example, the computer system described above with reference to FIG. 1. Communications interfaces 82 can be any one of the well known communications interfaces such as Ethernet connections, modem connections, and so on.

Server computer 20b comprises server software that operates as described in detail below to control access to documents that are undergoing revision in a publishing workflow. The electronic documents that are under control of the server software may be located on server computer 20b, client computer 20a, or data source 20c. Client computers 20a can access server computer 20b via communications network 80 to access documents which' are being routed through a workflow and which are under control of server computer 20b.

As will be readily understood by those skilled in the art of computer network systems, and others, the system illustrated in FIG. 2 is exemplary, and alternative configurations may also be used in accordance with the invention. For example, server computer 20b may comprise a plurality of computing devices. Additionally, the client computer 20a and server computer 20b may be the same physical device. As discussed above, the client computer 20a and the server computer 20b may communicate through any type of communication network or communications medium.

Detailed Description of System and Method for Document Isolation

Figure 3:
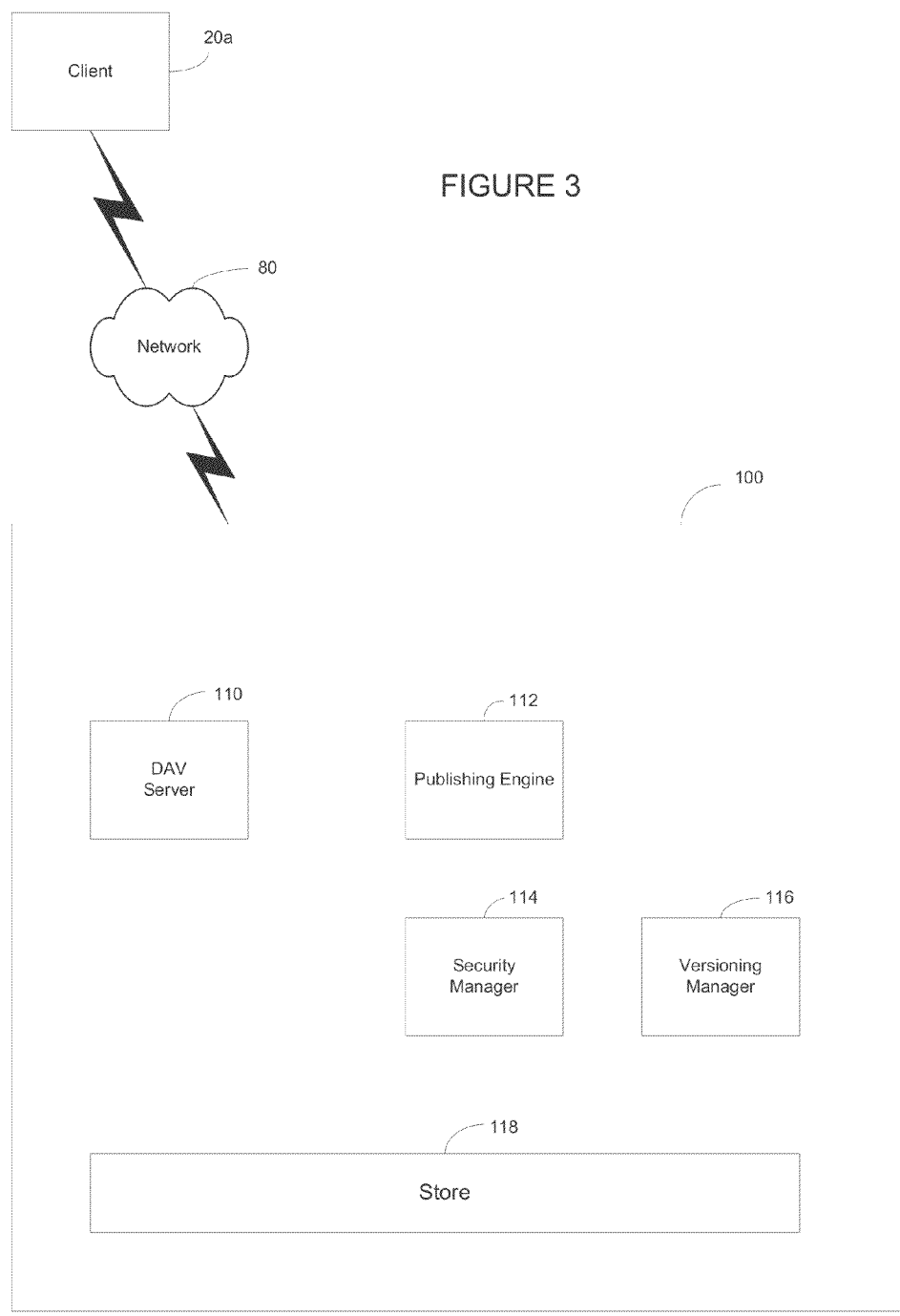
FIG. 3 is a block diagram illustrating representative modules of system software that operate in accordance with the invention.

FIG. 3 is a diagram of software modules of server software 100 that operate on server computer 20b in accordance with aspects of the invention. As shown, server software 100 comprises distributed authoring and versioning (DAV) server 110, publishing engine 112, security manager 114, versioning manager 116, and store area 118.

Store area 118 operates as a repository for information objects such as folders, documents, and role memberships as defined on the folders and documents. If, upon receipt of a request for a document, the requesting user has the appropriate permissions, store area 118 is accessed in order to retrieve the requested document.

DAV server 110 receives requests formatted according to the DAV standard and forwards the requests to the appropriate system software component. DAV server is operable to field requests that are formatted to take advantage of the publishing capabilities of the system as well as those that do not.

Publishing engine 112 provides the capability to create and maintain workflows. When a document is placed in a workflow, publishing engine 112 provides for routing the document to the appropriate persons in the workflow template.

Versioning manager 114 operates to create, maintain, and track versions of documents. During the period that a document is undergoing a publishing workflow, numerous versions of a document may be created. Versioning manager 114 controls the versioning during the publishing process.

Security manager 116 provides for the creation, maintenance, and enforcement of restrictions on performing publishing operations. Thus, when it is desired to create a new publishing operation and define which roles may have access to them, security manager 116 provides the needed functionality. Furthermore, when a request to perform a publishing operation is received, security manager 116 determines whether the particular user has been granted permissions to the operation.

Generally, workflow templates may be used in the publishing environment to insure that a new document or a revision to an existing document is subject to a standard review procedure before it becomes generally available. For example, a manager of a testing department may desire to establish a document publishing workflow through which all test-plan documents must pass prior to being made generally available. During the period that a new document or a revision to a document is undergoing editing and approval in the workflow template, those users that are not involved with the approval process should have access to the base document while those persons involved with the approval process should be directed to the latest version of the revised document. According to an aspect of the invention, access to the base document as well as any versions that may be created during a publishing workflow are controlled by placing read/write security controls on the documents. Similarly, permissions to perform a publishing operation are identified through security controls on the base document.

Figure 4:
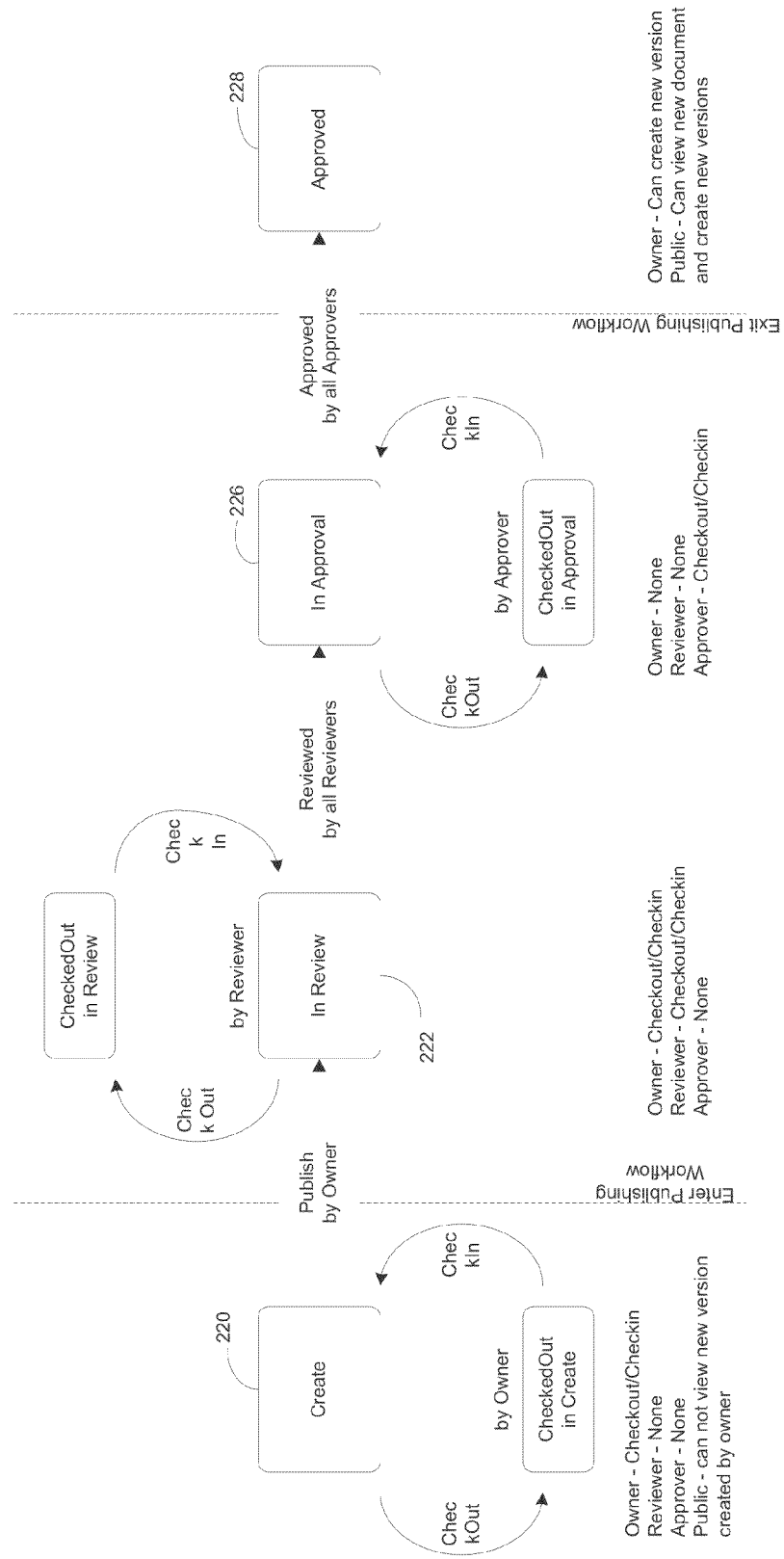
FIG. 4 is a chart illustrating a workflow 20 that may be facilitated by systems and methods in accordance with the present invention.

FIG. 4 illustrates an exemplary publishing workflow that may be implemented using systems and methods in accordance with the present invention. The workflow can be thought of as encompassing various stages or "states" through which a document passes. According to an aspect of the present invention, the version of the document that a user may access as well as the operations that the user may perform on a document while it is in a particular "state" is limited by the role that a user has been granted.

According to the publishing workflow template illustrated in FIG. 4, initially a document can be thought of as existing in a "create" state 220. While a document is in create state 220, a user, who may be referred to as the document owner, can checkout and revise a document. As noted in FIG. 4, while the document is in create state 220, users that have been assigned roles applicable to the workflow, which in this example include reviewer and approver roles, do not have privileges to perform specialized publication operations on the document. When a document is checked-out by the owner during create state 220, users other than the owner, referred to collectively as "public users," cannot view the checked-out version of the document. If a public user attempts to access the document while it is checked-out, the user is redirected to the version of the document that existed prior to the document having been checked-out.

While in create state 220, when the owner checks-in the document, a publishing workflow is invoked and the revised document enters "in-review" state 222. While a document is in in-review state 222, the document owner as well as users that have been assigned the reviewer role may check-out the document for editing. In contrast, users that have been assigned the approver role may not check-out a document while it is in in-review state 222. Public users may not even see the new document but rather will be referred to the version of the document that existed prior to the owner checking-out the document. When all of the users with the reviewer role have accessed the document, the document is forwarded to "in-approval" state 226.

While a document is in "in-approval" state 226, users that have been assigned the approver role can check-out the document to review the document and, if appropriate, upon checking-in the document, acknowledge their approval of the document. The document owner and users that have been assigned the reviewer role do not have the capability to check-out the document while it is in-approval state 226. Public users do not even see the revised document but rather are referred to the version of the document that existed prior to the owner checking out the document.

When all of the users with the approver role have accessed the document, the document leaves the publishing workflow and enters "approved" state 228. In approved state 228, the public can access the revised and approved document. Users assigned the reviewer and approver roles have no special privileges once the document has been approved and has left the publishing workflow. The approved document may, thereafter, enter the create state 220 upon being checked out and revised.

According to an aspect of the present invention, during the period that a document is in a publishing workflow, the system maintains a working copy document corresponding to the base document. Several versions of the working copy document may be created over the course of the publishing workflow. Users are selectively directed to the appropriate version of the document as specified by the workflow. Further, users are selectively granted the capability to perform publishing operations on the document undergoing a publishing workflow.

Generally, access to documents and publishing operations that may be performed on those documents is controlled using security controls. For each base document there is defined a security descriptor and a publishing operation access control list (ACL). Generally, the security descriptor defines who may read and write to the document. The security descriptor plays an essential part in identifying to which version of a document a user should be directed. In particular, users are directed to the most recent version of a document to which they have been granted read access. For example, the security descriptors on a base document are evaluated in light of the publishing state the document is currently in and the user's role to determine if the user has access to the document at all, and, if so, whether the user should be directed to the base document or whether the user should be directed to the working copy document. Thus, it is possible to identify that the general public have read access to a base document while users that have been assigned the editor role are directed to the working copy document.

The security controls of the present invention further comprise a publishing operation access control list (ACL). Generally, the publishing operation ACL's, which are described in detail below, are maintained for each base document. A publishing operation ACL defines the publishing operations that may be performed on the document, including working copies, by users that have been assigned specific roles. Thus, upon receipt of a request to perform a publishing operation on a document, the requesting user's roles are evaluated against the publishing operation ACL that is associated with the base document. The requestor is permitted to perform publishing operations on the document to the extent his or her roles have been granted privileges to the document. For example, if a user is interested in performing a check-out operation, he or she issues a check-out command on the base document. The publishing operation ACL associated with the base document is referenced to determine whether the user's roles have been granted the privilege to check-out. If so, a new version of the working copy of the document is created and the access control list associated with the base document is modified to identify that only that particular user has privileges to perform a check-in operation.

Figure 5:
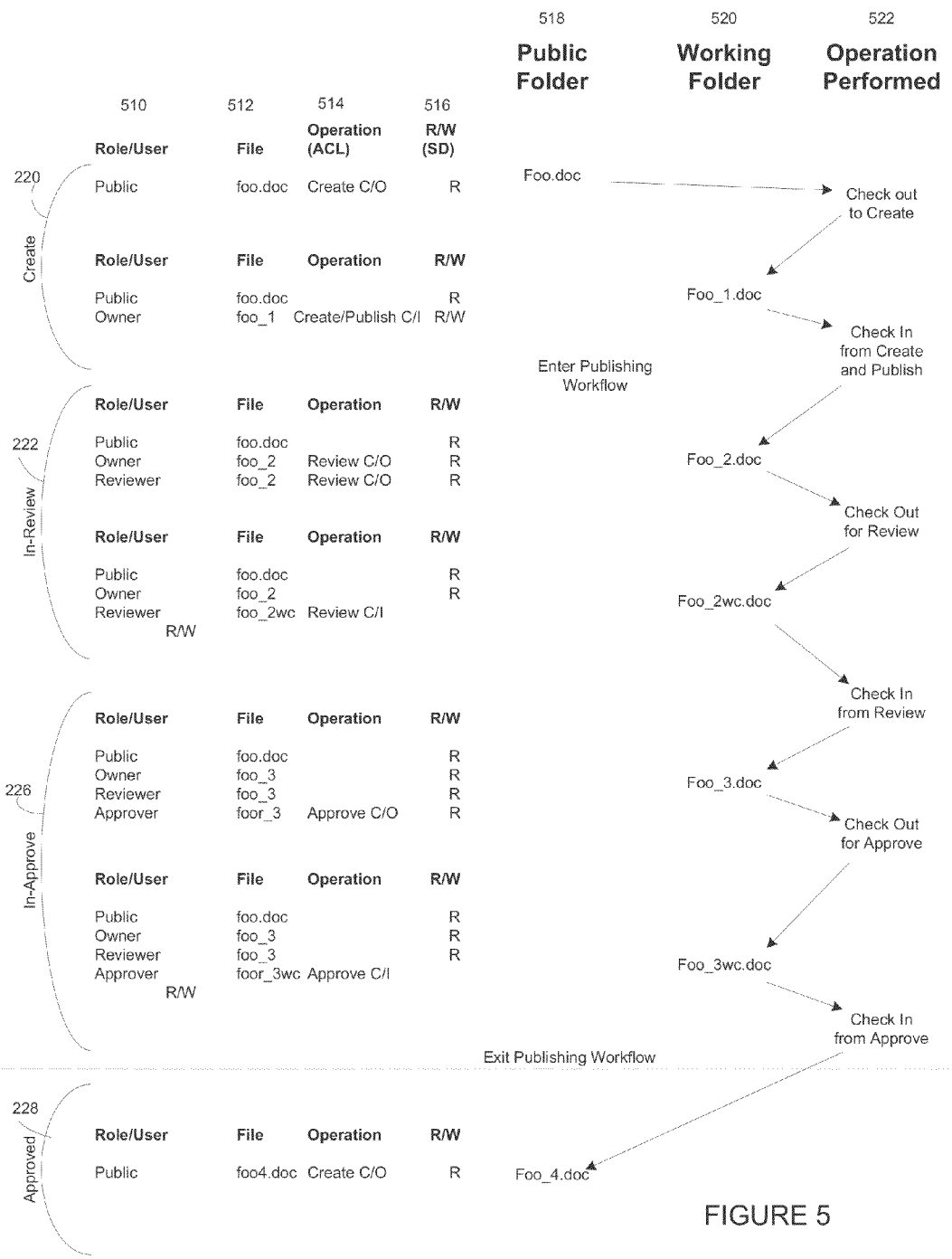
FIG. 5 is a table illustrating values for the access controls that may be maintained for a document as the document moves through states of a publishing workflow.

FIG. 5 is a table illustrating values for the security controls, including security descriptors and publishing operation ACL's, that are maintained for an exemplary document entitled "foo.doc" as the document moves through the various states in the publishing workflow described above in connection with FIG. 4. As shown, the table comprises the following columns: role/user column 510 which identifies a user or role; file column 512 which identifies the name of a file to which the user or role of column 510 has access; publishing operation column 514 which corresponds to the publishing operation ACL on the base document and which identifies the publishing operation, if any, that the role or user of column 510 may perform on the file of column 512; read write column 515 which corresponds to information contained in the security descriptor for the document identified in column 512 and which identifies whether the user or role identified in column 510 has read or write privileges to the file identified in column 512; public folder column 518 which identifies that the file listed therein may be accessed by the general public; working folder column 520 which identifies that the file listed therein resulted from the operation of the publishing workflow and access to the document is restricted; and operation performed column 522 which identifies the operations that are performed as a document progresses through a document publishing workflow. The various states (create 220, in-review 222, in-approve 224, and approved 228) that are represented in FIG. 4 are similarly identified in FIG. 5.

As shown, in create state 220, the document foo.doc is generally accessible to the public, as designated in column 516, and may be checked-out by members of the public to revise the document, as designated in column 514. If a check-out operation is performed by a member of the public, a new working copy document, foo__1.doc, is created and maintained separate from the base document foo.doc. The user that checks-out the document is considered to be the "owner" of the document. The security descriptor associated withfoo__1.doc is set to indicate, as reflected in column 516, that the owner has read and write privileges. It should be noted that members of the public do not have access to the new working copy of the document foo__1.doc and in fact, do not have access to any of the subsequent versions until the publishing workflow is complete. Indeed, public users that are not involved with the publishing workflow are directed to foo.doc until the workflow is complete and a new public document is created. The publishing operation ACL associated with the base document, foo.doc, is updated, as reflected in column 514, to indicate that the owner may perform a check-in operation.

When the owner performs the check-in operation, the "in-review" state of the publishing workflow template is entered and a new version of the working copy document entitled foo-2.doc is created. The security descriptor associated with foo 2.doc is created, as reflected in column 516, to identify that the document owner and those users with the reviewer role may view the newly created 10 foo__2.doc. The public, however, continues to be directed to foo.doc and does not even see foo 2.doc. Further, as represented in column 514, the publishing operation ACL associated with the base document, foo.doc, is updated to indicate that the owner and users assigned the reviewer role have permissions to perform check-out operations.

When a user with the reviewer role performs a check-out operation on foo__2.doc, a new version of working copy document, foo__2wc.doc, is created. The security descriptor associated with foo-2wc.doc is updated, as reflected in column 516, to identify that the reviewer who checked out foo 2.doc has read and write privileges to foo__2wc.doc. Accordingly, when the reviewer accesses foo.doc, he or she is directed to foo 2wc.doc. The document owner meanwhile, continues to be directed to foo__2.doc. Further, as represented in column 514, the publishing operation ACL associated with the base document, foo.doc, is updated to indicate that the reviewer has permissions to perform check-in operations while the owner has no permissions.

When the reviewer has finished editing foo__2wc.doc and performs a check-in operation, in-approve state 226 is entered and a new document, foo 3.doc, is created. The security descriptor related to foo 3.doc identifies that the owner, users with the reviewer role, and users with the approver role may view the new document. Accordingly, if the owner or users with either the reviewer or approver role were to request access to foo.doc, they will be directed to foo 3.doc.

The publishing operation ACL associated with base document, foo.doc, is updated to indicate that users with the approver role may perform a check-out operation. Users with the reviewer role no longer have permissions to perform check-in operations.

When a user with the approve role performs a check-out operation on foo 3.doc, a new version of the working copy document, foo 3wc.doc, is created. As reflected in column 516, the approver who checked out the document has permissions to read and write to foo 3wc.doc and will automatically be routed to that version when he or she accesses foo.doc. The security descriptors indicate that the document owner and users with the reviewer role may access foo__3.doc but not foo__3wc.doc. As designated in column 514, the publishing operation ACL associated with the base document indicates that the user with the approver role that checked out the document has permissions to perform a check-in operation. The document owner and users with the reviewer role do not have permissions to perform publishing operations.

As shown, when the user with the approver role performs a check-in, or approve operation, the publishing workflow is complete and approved state 228 is entered. Upon the check-in operation being performed, a new version of the document, foo 4.doc, is created. Indeed, in a preferred embodiment, the base document is overwritten by foo__4.doc. As indicated in column 516, foo__4.doc is available to the public. This is in contrast to the situation at the beginning of the workflow wherein the public is directed to the document foo.doc.

Figure 6:
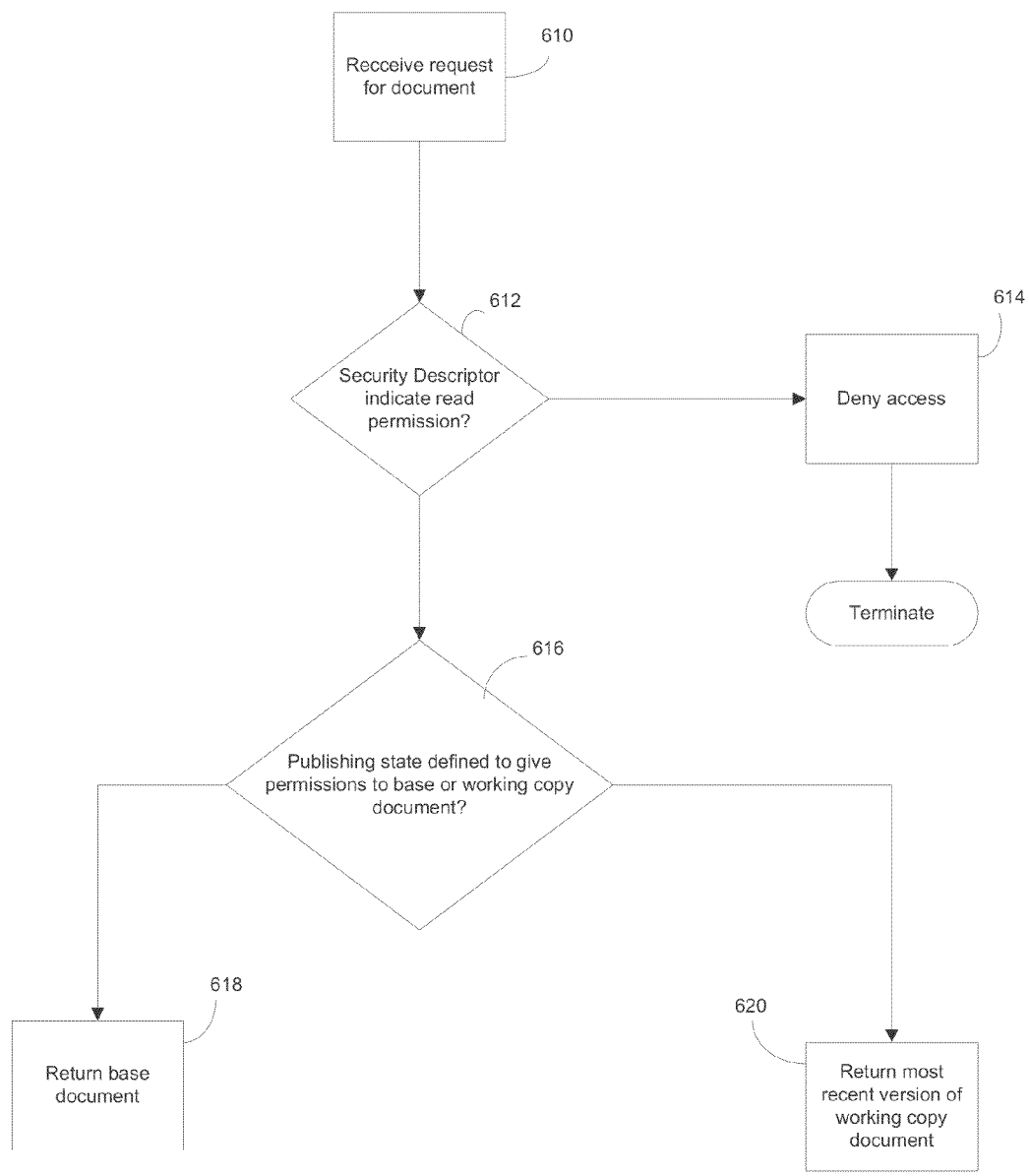
FIG. 6 is a flow diagram of a process for handling a user request to access a document in accordance with the invention.

As the preceding example illustrates, during the period that a document is undergoing revision in a publishing workflow, a separate copy of the base document, the working copy document, is maintained. Thus, the base document is isolated from the several versions of the working copy document that are created. Security controls are placed on the base document to identify which document a user may access as well as to identify the operations users may perform on those documents. Specifically, security descriptors are defined for each document and identify which users have read and write access to the documents. The security descriptor information is used to resolve which document, either base or working copy, a user is directed to upon receipt of a request to access the document. Furthermore, publishing operation ACL's are defined for each base document and identify which publishing operations, for example, check-out and check-in, a user may perform. FIG. 6 is a flow diagram of a process for handling user requests to access a document. As shown, at step 610, a request to view a document is received. At step 612, the security descriptor on the base document is evaluated to determine whether the user or the user's role has read access to the document. If not, at step 614 the user is denied access to the document. At step 616 the security descriptor on the base document is evaluated in light of the user's role and the publishing state in which the document is located to determine if the user should be directed to the base document or the working copy document. If the user or user's role should not have access to the working copy as defined by the publishing model state, at step 618, the base document is returned to the user. If the user or user's role should have access to the working copy as defined by the publishing model state in which the document is located, at step 620, the most recent version of the working copy is document is returned to the user.

Figure 7:
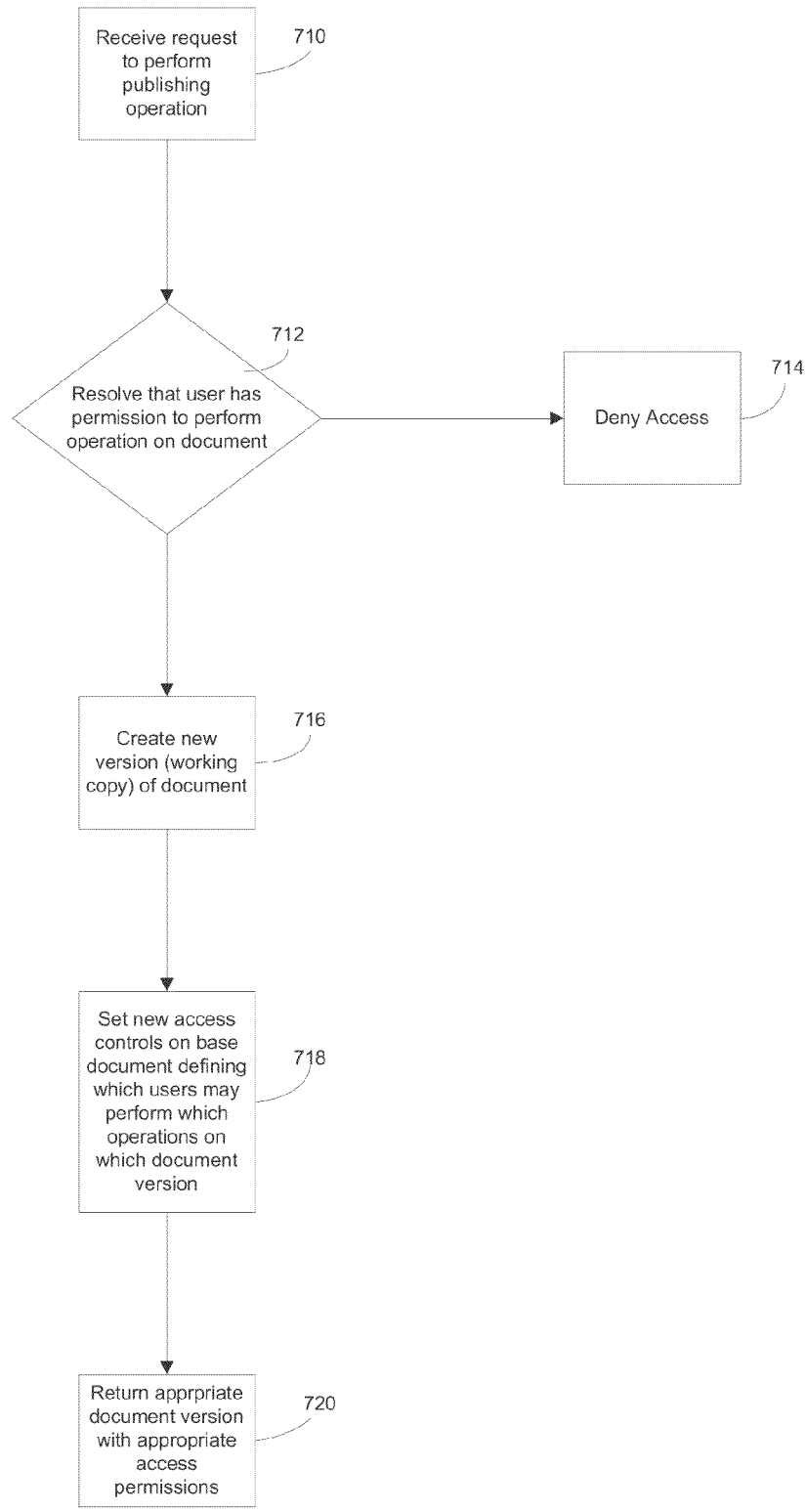
FIG. 7 is a flow diagram of a process for handling a user request to perform a publishing operation on a document in accordance with the present invention.

FIG. 7 provides an overview of the process for handling user requests to perform a publishing operation on a document undergoing revision in a document workflow. As shown, at step 710, a request is received to perform a publishing operation such as, for example a check-out operation. At step 712, it is resolved whether the user has permission to perform the requested operation on the document. The process for making this determination is described below in detail with reference to FIG. 8. Generally, however, the resolution is made by comparing the requesting user's roles with the publishing operation ACL stored in relation with the base document.

If at step 712, it is determined that the user does not have permissions to perform the desired operation, at step 714, permission is denied. If however, the user does have permission, at step 716 a new working copy of the document is created. The security descriptor for the new document is created so as to designate that the appropriate parties have access to the document. For example, if the user is performing a check-out operation, which causes a new working copy document to be generated, the security descriptor identifies that the party checking out the document has read and write privileges to the document. At step 718, the publishing operation ACL on the base document is updated to correspond to the changed status of the document. For example, if the user has requested to check-out the document and a new working copy of the document has been created, the publishing operation ACL associated with the base document is updated to indicated that only the user who has checked out the document has permissions to perform a check-in operation on the document. Thereafter, at step 720, the user is given access to the document and the means to perform the requested operation.

Figure 8:
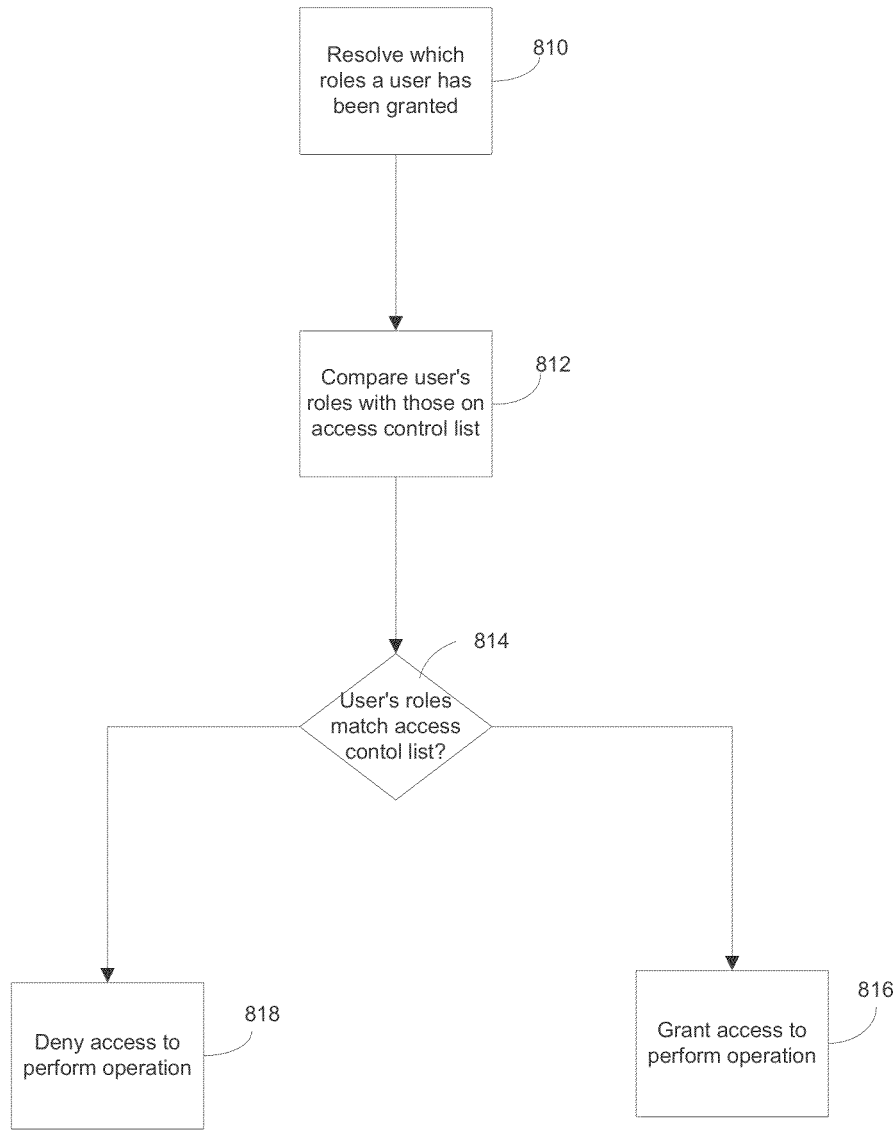
FIG. 8 is a flow diagram illustrating the process for resolving whether a user should be granted permission to perform a publishing operation in accordance with the present invention.

FIG. 8 provides a flow chart illustrating the process for resolving whether a user should be granted permission to perform a publishing operation on a document. As shown, at step 810, the roles that have been assigned to the user are identified. At step 812, the set of roles that have been assigned to the user are compared to the list of role privileges within the publishing operation ACL that is associated with the base document. If at step 814, one or more of the user's assigned roles have been granted permission to perform the desired operation, at step 816, it is resolved to grant permission to perform the operation. If at step 814, however, none of the user's assigned roles have been granted permission to perform the desired operation, at step 818, it is resolved to deny permission to perform the operation.

As illustrated by the flow diagrams of FIGS. 6, 7, and 8, access to documents and document publishing operations is controlled through the security descriptors and publishing operation ACL's that are maintained by the system. Security descriptors identify the users that have read and write access to the document. The publishing operation ACL's identify the publishing operations that users may perform.

Figure 9:
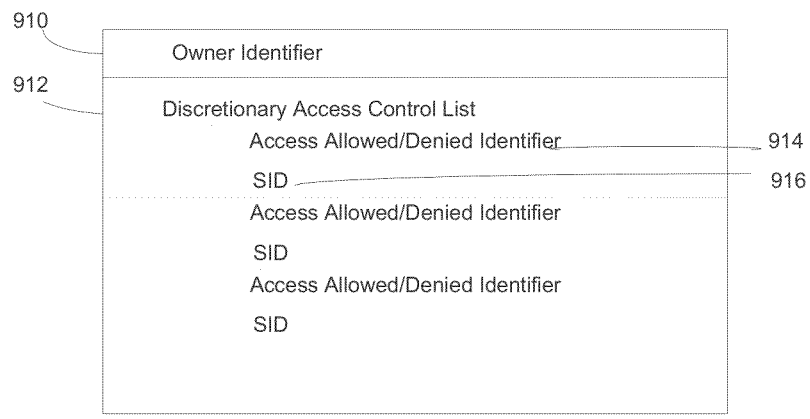
FIG. 9 is an illustrative example of component parts of a security descriptor in accordance 15 with the present invention.

FIG. 9 provides an illustrative example of the component parts of a security descriptor for use in the present invention. As shown, a security descriptor comprises owner identifier 910 and a discretionary access control list (DACL) 912. Owner identifier 910 identifies the user who created the document. DACL 912 comprises a series of structures, which might be referred to as access control entry (ACE) structures, wherein each structure comprises an access allowed/denied identifier 914, and a security identifier (SID) 916. SID 916 uniquely identifies a user or role. Access allowed/denied identifier 914 specifies whether the user or role identified by SID 916 has read or write access to the particular document. As shown, DACL 912 may comprise a plurality of entries.

As described above in relation to FIG. 5, the documents which a user has permission to access changes as a document proceeds through a workflow. The security descriptors related to the documents are modified as appropriate to institute and enforce these changes. Further, when a request is received to access a document, the appropriate document to which the user should be directed is resolved using the security descriptors.

Figure 10:
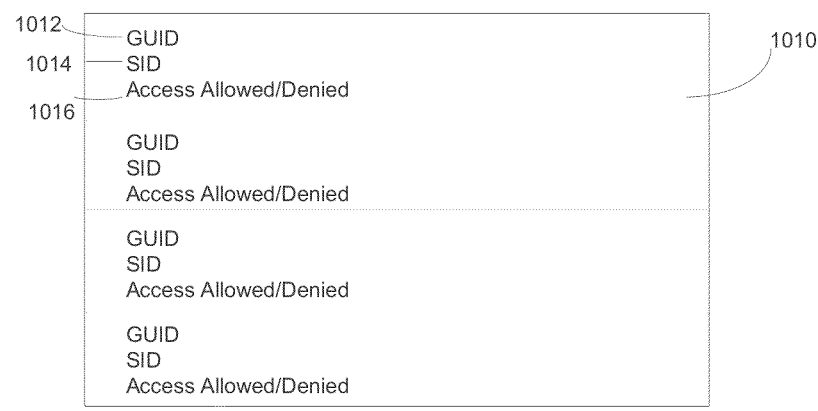
FIG. 10 is an illustrative example of component parts of an access control list in accordance with the present invention.

FIG. 10 provides an illustrative example of the component parts of a publishing operation ACL for use in the present invention. As shown, a publishing operation ACL comprises a list of structures 1010, wherein each structure comprises a global level unique identifier (GUID) 1012, a unique security identifier (SID) 1014, and an access allowed/denied identifier 1016. In one embodiment, structures 1010 may be referred to as ACE'S, although the ACE's have been extended from those defined for DACL's 912. GUID 1012 identifies a publishing operation and SID 1014 identifies a role or user that has access to the publishing operation identified by GUID 1012. In one embodiment, GUID 1012 is a one-to-one mapping with a unique 128 bit number and an associated operation.

As described above in relation to FIG. 5, as a document proceeds through a workflow, the operations that a user or role can perform on the document change. Publishing operation ACL's are modified as appropriate to institute and enforce these changes. Further, upon receipt of a request to perform a publishing operation, the publishing operation ACL's are referenced to determine whether to permit or deny access to the requested operation.

According to an aspect of the invention, the systems and methods are extensible to accommodate new user-defined publishing workflows, new user-defined publishing operations, and new user-defined roles. Thus, when a new publishing operation is created, it is assigned a new GUID 1012. Similarly, when a new role is created, it is assigned a new SID 1014. User-defined GUID's and SID's may be added to a publishing operation ACL to enforce the restrictions instituted in a new workflow template as described above.

Thus, the present invention provides systems and methods for providing document isolation in a workflow environment. According to an aspect of the invention, when a revision is made to a document and the revision placed in a publishing workflow, a separate "working" copy of the original or "base" document is generated. As the document moves through the workflow, new versions of the "working" copy document may also be generated. Security controls, which define who may access the original document as well as any versions of the working copy document, are defined and stored in relation to the documents. The security controls further define the types of actions users may take with respect to the document. Thus, the invention provides for systems and methods that reliably control access to documents and that are extensible to accommodate user defined workflows. These aspects of the invention provide that the base document may be made available to users to view, even while a revision of the document is being approved in a publishing workflow.

Those skilled in the art understand that computer readable instructions for performing the above described processes can be generated and stored on a computer readable medium such as a magnetic disk or CDROM. Further, a computer such as that described with reference to FIG. 1 may be arranged with other similarly equipped computers in a network, and each computer may be loaded with computer readable instructions for performing the above described processes. Specifically, referring to FIG. 1, microprocessor 21 may be programmed to operate in accordance with the above-described processes.

While the invention has been described and illustrated with reference to specific embodiments, those skilled in the art will recognize that modification and variations may be made without departing from the principles of the invention as described above and set forth in the following claims. In particular, while the invention has been described with respect to limiting access to documents, the invention may be employed to control access to virtually any type of data object including folders. Further, while the invention has been described in the context of a publishing environment, the inventions may apply to other environments as well. Accordingly, reference should be made to the appended claims as indicating the scope of the invention.

What is claimed:

1. A method comprising:
responsive to receiving on a device a request to perform a new operation on a base document, creating a copy of the base document and creating a workflow relating to the base document; and
while the copy of the base document is in the workflow:
defining a security descriptor for the copy of the base document;
assigning a unique identifier to the new operation;
updating an access policy to include an entry for the unique identifier for the new operation;
updating the access policy to include an entry identifying persons that have access to the new operation; and providing access to perform the new operation on the copy of the base document based on the access policy and the security descriptor.

2. The method of claim 1, further comprising updating the access policy to change persons that have access to the new operation in response to a change from a first state to a second state by the copy of the base document in the workflow.

3. The method of claim 1, wherein the workflow is a publishing workflow and the new operation comprises reviewing the copy of the base document.

4. The method of claim 1, wherein the workflow is a publishing workflow and the new operation comprises approving the copy of the base document.

5. The method of claim 1, wherein updating the access policy to include an entry identifying persons that have access to the new operation comprises updating the access policy to include an entry identifying a role that has access to the new operation.

6. The method of claim 1, wherein updating the access policy to include an entry identifying persons that have access to the new operation comprises updating the access policy to include an entry identifying a user that has access to the new operation.

7. The method of claim 1, wherein updating an access policy to include an entry for the unique identifier for the new operation comprises updating an access control list.

8. The method of claim 1, wherein updating the access policy to include an entry identifying persons that have access to the new operation comprises updating an access control list.

9. The method of claim 1, further comprising receiving a request to perform the new operation on the copy of the base document, and referring to the access policy to determine whether to allow the requested operation to be performed on the copy of the base document.

10. The method of claim 9, wherein referring to the access policy to determine whether to allow the operation to be performed on the copy of the base document comprises comparing roles associated with a user to roles associated with the operation.

11. A memory having instructions stored thereon that, if executed by a computing device, cause the computing device to perform operations comprising:
  responsive to receiving a request on a device to perform a new operation on a base document, creating a copy of the base document and creating a workflow relating to the base document; and
  while the copy of the base document is in the workflow:
    defining a security descriptor for the copy of the base document;
    assigning a unique identifier to the new operation;
    updating an access policy to include an entry for the unique identifier for the new operation;
    updating the access policy to include an entry identifying persons that have access to the new operation;
    providing access to perform the new operation based on the access policy; and
    selectively granting access to an appropriate version of the copy of the base document based on the access policy and the security descriptor.

12. The memory of claim 11, the operations further comprising updating the access policy to change persons that have access to the new operation in response to a change from a first state to a second state by the copy of the base document in the workflow.

13. The memory of claim 11, wherein the workflow is a publishing workflow and the new operation comprises reviewing the copy of the base document.

14. The memory of claim 11, wherein the workflow is a publishing workflow and the new operation comprises approving the copy of the base document.

15. The memory of claim 11, wherein updating the access policy to include an entry identifying persons that have access to the new operation comprises updating the access policy to include an entry identifying a role that has access to the new operation.

16. The memory of claim 11, wherein updating the access policy to include an entry identifying persons that have access to the new operation comprises updating the access policy to include an entry identifying a user that has access to the new operation.

17. The memory of claim 11, wherein updating an access policy to include an entry for the unique identifier for the new operation comprises updating an access control list.

18. The memory of claim 11, wherein updating the access policy to include an entry identifying persons that have access to the new operation comprises updating an access control list.

19. The memory of claim 11, the operations further comprising receiving a request to perform the new operation on the copy of the base document, and referring to the access policy to determine whether to allow the requested operation to be performed on the copy of the base document.

20. A system comprising:
  a processor; and
  a memory coupled to the processor, the memory having stored thereon executable instructions that when executed by the processor cause the processor to effectuate operations comprising:
    responsive to receiving a request to perform a new operation on a base document, creating a copy of the base document and creating a workflow relating to the base document; and
    while the copy of the base document is in the workflow:
      defining a security descriptor for the copy of the base document;
      assigning a unique identifier to the new operation;
      updating an access policy to include an entry for the unique identifier for the new operation;
      updating the access policy to include an entry identifying persons that have access to the new operation; and
      providing access to perform the new operation based on the access policy and the security descriptor.

* * * * *